UNITED STATES PATENT OFFICE.

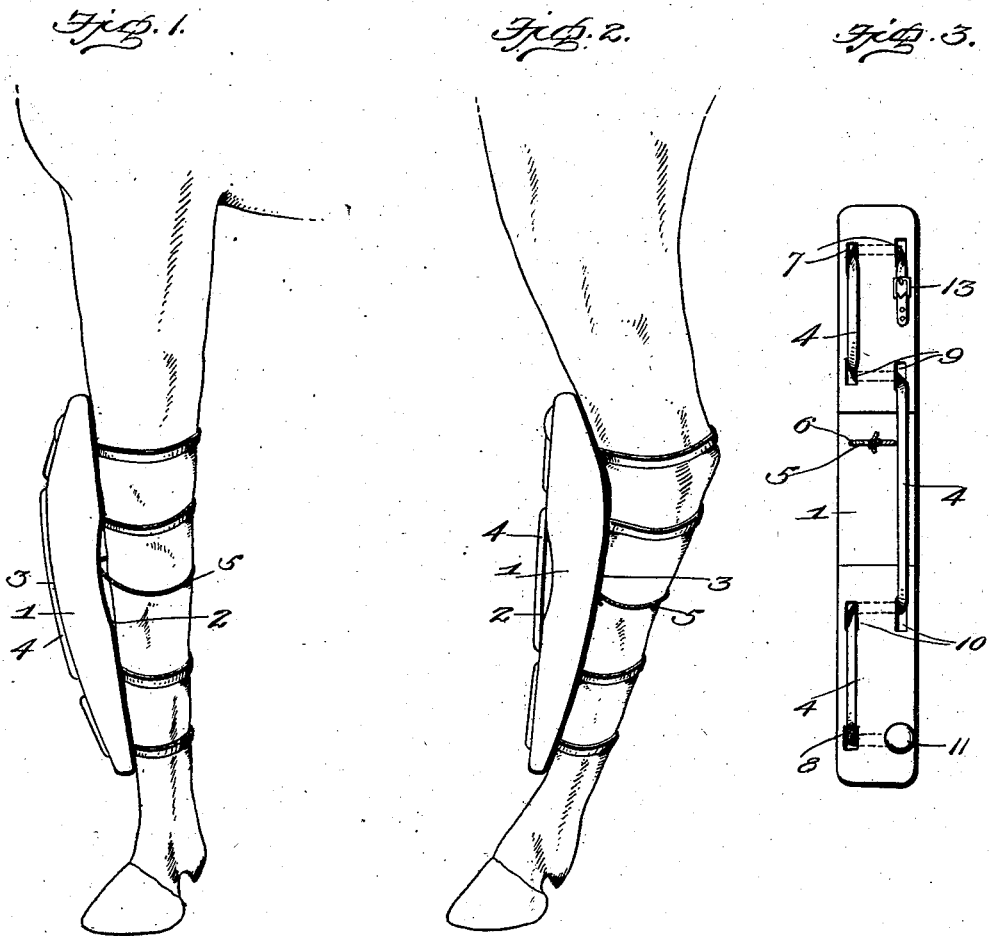

CORNELIUS M. WALES, OF GUNTOWN, MISSISSIPPI.

HOPPLE.

SPECIFICATION forming part of Letters Patent No. 723,562, dated March 24, 1903.

Application filed September 4, 1901. Serial No. 74,313. (No model.)

*To all whom it may concern:*

Be it known that I, CORNELIUS M. WALES, a citizen of the United States, residing at Guntown, in the county of Lee and State of Mississippi, have invented a new and useful Hopple, of which the following is a specification.

The invention relates to improvements in hopples.

The object of the present invention is to improve the construction of hopples and to provide a simple, inexpensive, and efficient one adapted to be readily applied to the leg of an animal and capable of effectually preventing the animal from running, jumping, or kicking, whereby vicious and unruly animals may be readily controlled.

A further object of the invention is to provide a device of this character adapted to be readily applied to either the fore or hind legs of an animal and capable of being readily carried by the animal without liability of injuring it.

The invention consists in the construction and novel combination and arrangement of parts hereinafter fully described, illustrated in the accompanying drawings, and pointed out in the claims hereto appended.

In the drawings, Figure 1 is an elevation of a hopple constructed in accordance with this invention and shown applied to the fore leg of an animal. Fig. 2 is a similar view, the hopple being applied to the hind leg of an animal. Fig. 3 is a detail view of the hopple, illustrating the arrangement of the lace for securing the hopple to the hind leg of an animal.

Like numerals of reference designate corresponding parts in all the figures of the drawings.

1 designates a laterally-reversible hopple, consisting of a bar adapted to be applied to the fore or hind leg of an animal, as illustrated in Figs. 1 and 2 of the accompanying drawings, and provided with a face 2, conforming to the configuration of the knee and adjacent portions of the fore leg of a horse or other animal and having the opposite face 3 conforming to the configuration of the front of the hind legs of a horse or other animal. The face 2, which fits against the fore leg, is approximately straight, and the face 3, which fits the hind leg, is convex, as clearly shown in Fig. 2.

The hopple is secured to the animal by means of a lace 4, of leather or other suitable material, which is passed through suitable perforations of the hopple and forming a series of loops, which pass around the leg, as shown.

In applying the hopple to an animal it is supported while being laced by a cord 5 or other suitable flexible device which is passed through approximately central perforations 6 and which is tied around the leg.

The hopple is provided at its top and bottom with pairs of openings or perforations 7 and 8, and it has upper and lower intermediate openings or perforations 9 and 10. The strap or other device constituting the lace is provided at one end with a button 11 or other suitable form of stop, is passed through the bottom right-hand opening or aperture 8, and extended around the leg to the other bottom opening or aperture 8. The lace is then extended upward to the adjacent left-hand aperture 10 and is passed around the leg to the other aperture 10. From this point the lace is extended upward to the right-hand aperture 9 and is passed through the same and around the leg to the other aperture 9 and is then extended to the top. The free end of the strap after being passed through the right-hand top aperture is secured by a buckle 13 or other suitable fastening device. This arrangement, which is clearly shown in Fig. 3, forms loops for securing the laterally-reversible hopple to the hind leg of an animal; but the pairs of perforations will permit the strap to readily form a series of loops for encircling the front leg of an animal, as shown in Fig. 1. In forming these loops the strap is passed through one set of perforations, and after the loop is formed the strap is carried to the next set of perforations, and this operation is continued until the strap has been passed through all of the perforations. The lace, which forms a series of bands or loops, securely fastens the hopple to the leg, and the said hopple, which may be constructed of any suitable material, such as wood, is light, strong and durable, and may be worn by various kinds of animals without liability of bruising or otherwise injuring them. It is adapted to prevent horses and other animals from kicking, jumping, and running, and it may be advantageously employed in breaking young colts. As an animal becomes gentle after having worn the hopple for some time the lace may be loosened to afford greater freedom to the animal, and the cord or band 6 may be used for supporting the hopple while the lace is loose.

It will be seen that the hopple is exceedingly simple and inexpensive in construction, that it fits the knee portion of the leg of an animal, and that it is reversible to enable it to be applied to either leg. It will also be apparent that when a hopple is applied to one of the fore legs and to one of the hind legs of a horse or other animal the latter will be effectually prevented from running, jumping, or kicking and that it will enable vicious animals to be readily controlled. Furthermore, it will be clear that the series of bands or loops formed by the lace will hold the hopple snugly against the leg of an animal and prevent the same from bending at the joint.

What I claim is—

1. A reversible hopple provided with opposite leg-engaging faces adapted respectively to fit and conform to the configuration of the front and hind legs of an animal to enable the hopple to be applied to either leg and to contact with the same, substantially throughout its entire length, one of the leg-engaging faces presenting a continuously-curved convex surface to conform to the configuration of the front portion of the hind leg of an animal and the other leg-engaging face consisting of approximately straight upper and lower surfaces and an intermediate connecting concave surface extending from the inner end of one straight surface to the inner end of the other, said hopple consisting of a bar provided at intervals throughout its length with openings arranged in pairs and extending entirely through it, and a reversible continuous lace arranged in said openings and forming a vertical series of horizontal leg-receiving loops, said lace being removably arranged in the openings and being reversible to extend the loops from either of the leg-engaging faces of the hopple, substantially as described.

2. A hopple comprising a reversible bar provided with opposite leg-engaging faces adapted respectively to fit and conform to the configuration of the front and hind legs of an animal to enable the hopple to be applied to either leg and to contact with the same, substantially throughout its entire length, one of the leg-engaging faces presenting a continuously-curved convex surface to conform to the configuration of the rear leg of an animal and the other leg-engaging face consisting of upper and lower approximately straight surfaces, and an intermediate connecting concave surface extending from the inner end of one straight surface to the inner end of the other, said bar being provided at intervals throughout its length with pairs of openings and having a pair of perforations arranged adjacent to its center; a reversible continuous lace arranged in the said openings and forming a vertical series of horizontal leg-receiving loops, said lace being removably arranged in the openings and being reversible to extend the loops from either leg-engaging face of the bar, and a supplemental temporary flexible connection arranged in the central perforations of the bar and forming a leg-receiving loop adapted to support the bar in position on the leg of an animal while the lace is being adjusted, substantially as described.

In testimony that I claim the foregoing as my own I have hereto affixed my signature in the presence of two witnesses.

CORNELIUS M. WALES.

Witnesses:
P. H. SPRADLING,
J. C. MITCHELL.